(12) United States Patent
Dietz (10) Patent No.: US 8,408,074 B2
(45) Date of Patent: Apr. 2, 2013

(54) RISER ANNULUS FLOW METER AND METHOD

(75) Inventor: David Albert Dietz, Houston, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 297 days.

(21) Appl. No.: 12/882,447

(22) Filed: Sep. 15, 2010

(65) Prior Publication Data

US 2012/0060625 A1 Mar. 15, 2012

(51) Int. Cl.
*G01F 1/28* (2006.01)
*G01F 1/00* (2006.01)

(52) U.S. Cl. .................................. 73/861.74

(58) Field of Classification Search ............. None
See application file for complete search history.

(56) References Cited

U.S. PATENT DOCUMENTS

| | | | |
|---|---|---|---|
| 4,068,527 A | 1/1978 | Jost et al. | |
| 6,325,159 B1 | 12/2001 | Peterman et al. | |
| 6,356,071 B1 * | 3/2002 | Koski et al. | 324/207.13 |
| 6,510,748 B2 * | 1/2003 | Cooper | 73/861.74 |
| 2008/0060846 A1 * | 3/2008 | Belcher et al. | 175/25 |

FOREIGN PATENT DOCUMENTS

| | | |
|---|---|---|
| GB | 747613 A | 4/1956 |
| JP | 09113325 A | 5/1997 |
| JP | 1118638 A | 4/1999 |

OTHER PUBLICATIONS

GB Search Report issued Jan. 9, 2012 from corresponding Application No. GB 1115659.3.

* cited by examiner

*Primary Examiner* — Harshad R Patel
(74) *Attorney, Agent, or Firm* — Bracewell & Giuliani LLP (57) ABSTRACT

A mudline riser annulus flow meter includes a liner configured to be attached to a riser to cover a hole; a cover configured to be attached to the riser to cover the liner such that a cavity is formed by the liner and the cover; a sensor rod configured to be attached to the liner and to extend inside the cavity, the sensor rod having a bore; a magnet assembly configured to be fixedly attached to the sensor rod; and a waveguide tube attached to the cover. The bore of the sensor rod is configured to receive the waveguide tube.

20 Claims, 7 Drawing Sheets

RISER ANNULUS FLOW METER AND METHOD

BACKGROUND

1. Technical Field

Embodiments of the subject matter disclosed herein generally relate to methods and systems and, more particularly, to mechanisms and techniques for measuring a fluid flow in a pipe.

2. Discussion of the Background

During the past years, with the increase in price of fossil fuels, the interest in developing new production fields has dramatically increased. However, the availability of land-based production fields is limited. Thus, the industry has now extended drilling to offshore locations, which appear to hold a vast amount of fossil fuel. One characteristic of the offshore locations is the high pressure to which the drilling equipment is subjected. For example, it is conventional to have parts of the drilling equipment designed to withstand pressures between 5,000 and 30,000 psi. In addition, the materials used for the various components of the drilling equipment are desired to be corrosion resistant and to resist high temperatures.

Figure 1:
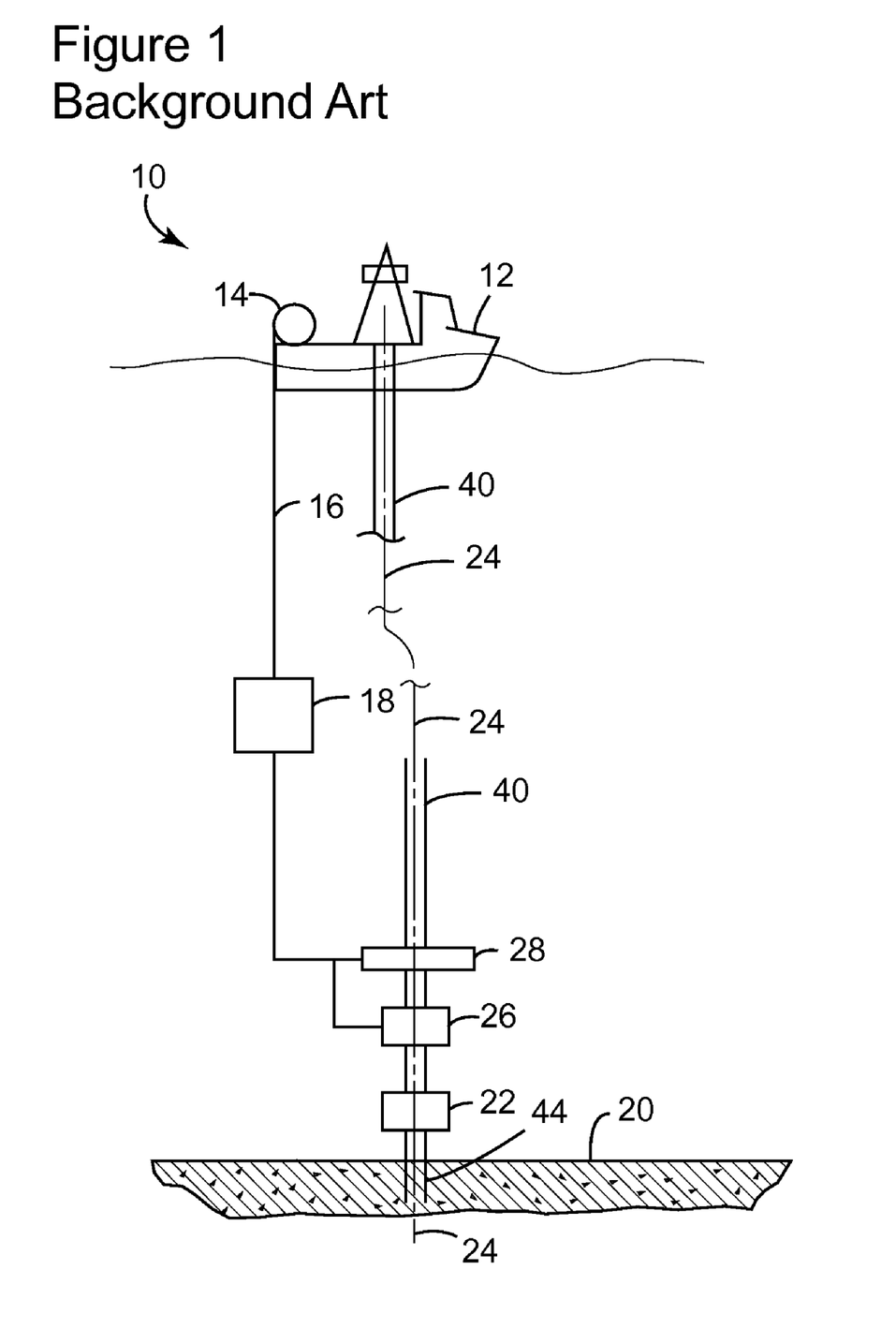
FIG. 1 is a schematic diagram of a conventional offshore rig.

Existing technologies for extracting oil from offshore fields use a system 10 as shown in FIG. 1. More specifically, the system 10 includes a vessel (or rig) 12 having a reel 14 that supplies power/communication cables 16 to a controller 18. The controller 18 is disposed undersea, close to or on the seabed 20. In this respect, it is noted that the elements shown in FIG. 1 are not drawn to scale and no dimensions should be inferred from FIG. 1.

FIG. 1 also shows that a drill string 24 is provided inside a riser 40, that extends from vessel 12 to a BOP 28. A wellhead 22 of the subsea well is connected to a casing 44, which is configured to accommodate the drill string 24 that enters the subsea well. At the end of the drill string 24 there is a drill bit (not shown). Various mechanisms, also not shown, are employed to rotate the drill string 24, and implicitly the drill bit, to extend the subsea well. The dirt and debris produced by the drill string 24 are removed by circulating a special fluid, called "mud", through an inside of the drill string 24 and then through an annulus formed between the outside of the drill string 24 and an inside of the riser 40. Thus, the mud is pumped from the vessel 12 through the drill string 24 down to the drill bit and back through the annulus of the riser 40 back to the vessel 12.

However, during normal drilling operation, unexpected events may occur that could damage the well and/or the equipment used for drilling. One such event is the uncontrolled flow of gas, oil or other well fluids from an underground formation into the well. Such event is sometimes referred to as a "kick" or a "blowout" and may occur when formation pressure inside the well exceeds the pressure applied to it by the column of drilling fluid (mud). This event is unforeseeable and, if no measures are taken to prevent it, the well and/or the associated equipment may be damaged. Although the above discussion was directed to subsea oil exploration, the same is true for ground oil exploration.

Thus, a blowout preventer (BOP) might be installed on top of the well to seal the well in case that one of the above events is threatening the integrity of the well. The BOP is conventionally implemented as a valve to prevent the release of pressure either in the annular space, i.e., between the casing and the drill pipe, or in the open hole (i.e., hole with no drill pipe) during drilling or completion operations. Recently, a plurality of BOPs were installed on top of the well for various reasons. FIG. 1 shows two BOPs 26 or 28 that are controlled by the controller 18.

However, deep water exploration presents a host of other drilling problems, such as substantial lost circulation zones, well control incidents, shallow-water flows, etc. Thus, many of these wells are lost due to significant mechanical drilling problems. A common characteristic of these problems is the abnormal flow of the mud. For example, the flow rate at the surface pump may become larger than the flow rate of the return mud at the ship. This suggests that the integrity of the well is compromised and the mud is escaping into the environment. Another possibility which is more dangerous for the safety of the personnel working on the rig is when the flow rate of the returning mud is larger than the flow rate of the surface pump. This event suggests that the integrity of the well may be compromised, and/or a high pressure intrusion into the well has taken place. This high pressure gas or fluid then may make its way up the riser and blowout the rig. If these events take place, it is noted that the operator of the BOP does not have the time to react and close the BOP. These events not only may lead to loss of lives but also increase the cost of drilling and reduce the chances that oil would be extracted from those wells, which is undesirable.

Accordingly, it would be desirable to provide systems and methods that avoid the afore-described problems and drawbacks.

SUMMARY

According to an exemplary embodiment, there is a mudline riser annulus flow meter. The flow meter includes a liner configured to be attached to a riser to cover a hole; a cover configured to be attached to the riser to cover the liner such that a cavity is formed by the liner and the cover; an insert configured to be disposed within the liner; a base configured to be attached to the insert; a sensor rod configured to be attached to the base and to extend inside cavity, the sensor rod having a bore; a magnet assembly configured to be fixedly attached to the sensor rod; a position sensor attached to the cover; and a waveguide tube attached to the position sensor. The bore of the sensor rod is configured to receive the waveguide tube.

According to another exemplary embodiment, there is a mudline riser joint that includes a first flow meter. The first flow meter is configured to include a liner configured to be attached to the riser joint to cover a hole; a cover configured to be attached to the riser joint to cover the liner such that a cavity is formed by the liner and the cover; an insert configured to be disposed into the liner; a base configured to be attached to the insert; a sensor rod configured to be attached to the base and to extend inside cavity, the sensor rod having a bore; a magnet assembly configured to be fixedly attached to the sensor rod; a position sensor attached to the cover; and a waveguide tube attached to the position sensor. The bore of the sensor rod is configured to receive the waveguide tube.

According to still another exemplary embodiment, there is a mudline riser annulus flow meter that includes a liner configured to be attached to a riser to cover a hole; a cover configured to be attached to the riser to cover the liner such that a cavity is formed by the liner and the cover; a sensor rod configured to be attached to the liner and to extend inside cavity, the sensor rod having a bore; a magnet assembly configured to be fixedly attached to the sensor rod; and a waveguide tube attached to the cover. The bore of the sensor rod is configured to receive the waveguide tube.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a riser connected to a subsea BOP. However, the embodiments to be discussed next are not limited to these systems, but may be applied to other systems that require the detection of a fluid flow undersea.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a flow meter is provided not only at a surface pump that pumps a mud through a riser but also at a location closer to a BOP or closer to a seabed surface. In this way, a flow rate difference between the flow rate of the pump and the flow rate of the return mud at the seabed surface may be detected earlier than in a case in which the flow rate of the return mud is determined at the sea surface. In this way, some abnormal behaviors in the riser may be detected prior to those abnormal behaviors surfacing with potential devastating effects. As a given amount of mud that starts its journey from the seabed or the bottom of the well to the rig may take about 20 minutes to arrive at the rig, by early detecting the abnormal flow of the mud in the well may give the personnel operating on the rig a time window enough for shutting down the well or abandoning the well depending on the situation.

As discussed above with regard to FIG. 1 plurality of riser joints 40 are used to connect an undersea BOP 26 to a rig 12 at the sea surface. The riser joints are traditionally made of steel or other resistant material that can withstand high pressures, corrosive environments and some bending due to the constant movement of the rig. Thus, each riser joint has a continuous outer skin for preventing a leakage of the mud flowing inside the riser.

Figure 2:
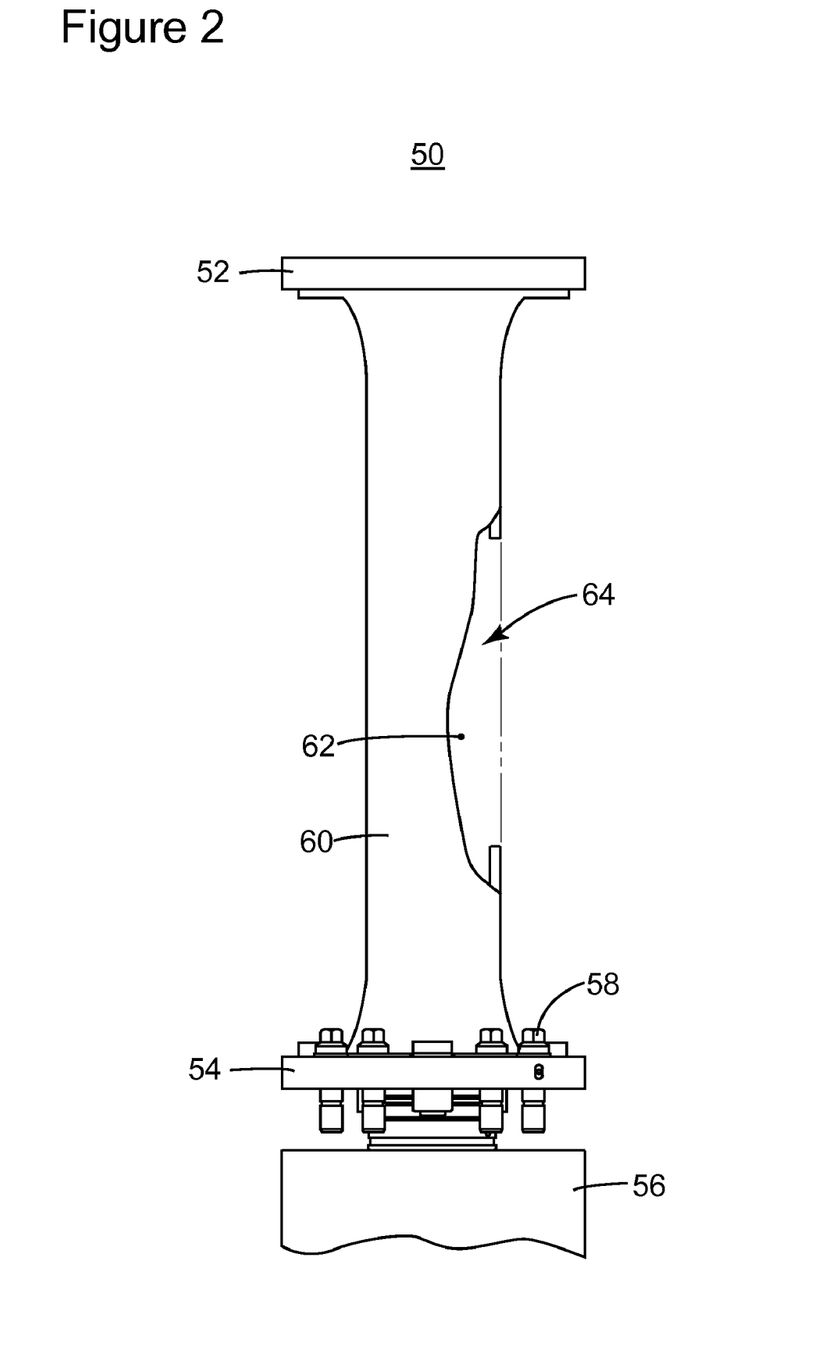
FIG. 2 is a schematic diagram of a riser according to an exemplary embodiment.

According to an exemplary embodiment illustrated in FIG. 2, there is a riser joint 50 having first 52 and second 54 flanges that are configured to connect to another riser or piece of equipment, e.g., BOP 56. FIG. 2 shows that riser joint 50 connected via flange 54 to a BOP 56. For example, the riser joint 50 may be deployed away from the BOP. However, the riser joint 50 does not has to be directly connected to the BOP 56. Bolts 58 are used to connect flange 54 to BOP 56. An outer surface or skin 60 of the riser joint 50 is configured to prevent a leak of a fluid flowing through an inside 62 of the riser joint 50. A flow meter may be attached to the riser joint as discussed next.

Figure 3:
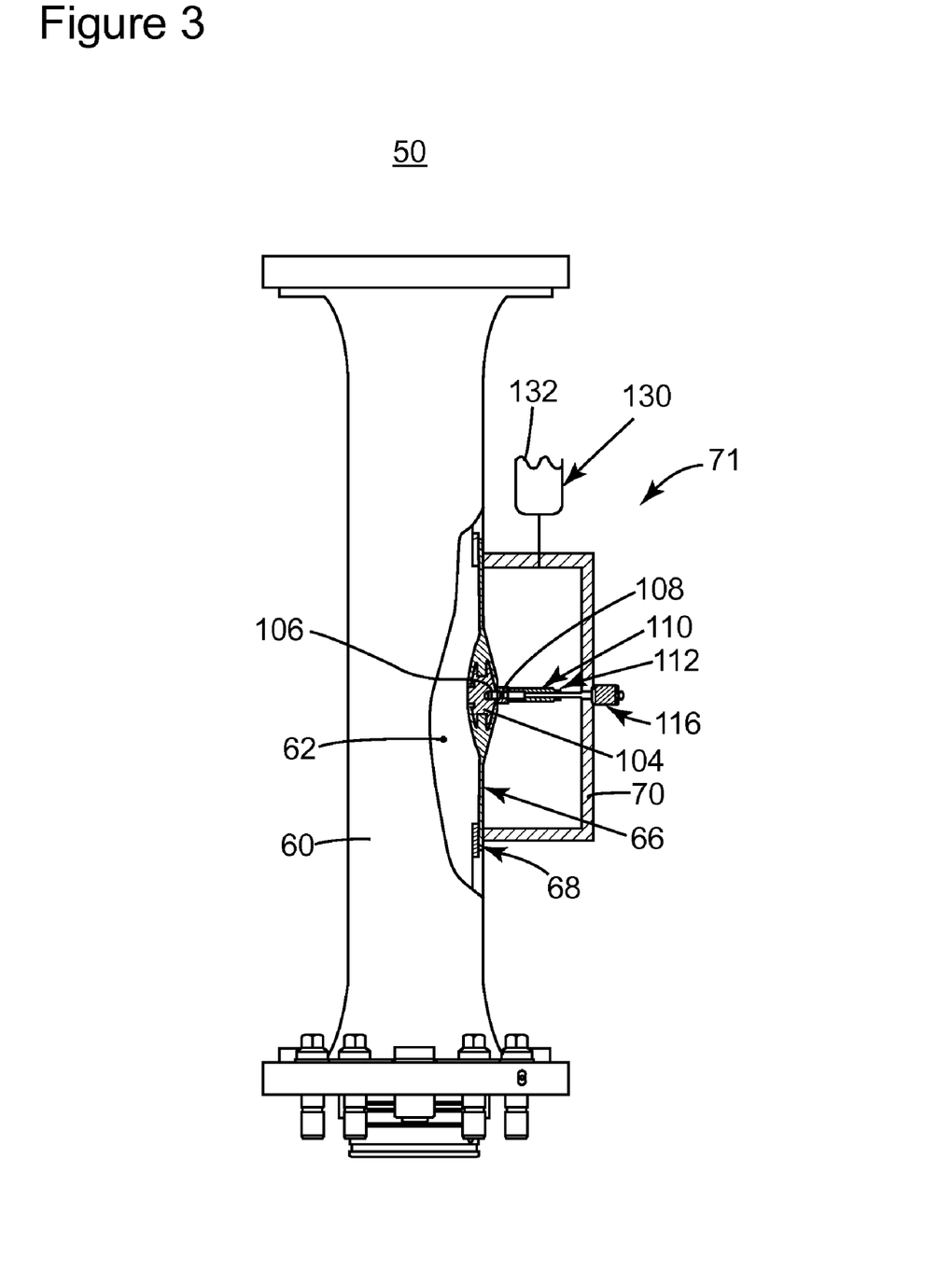
FIG. 3 is a schematic diagram of a riser having a flow meter according to an exemplary embodiment.

As shown in FIG. 2, a hole 64 is formed on a side of the riser joint 50 and that hole may be covered with a liner 66 as shown in FIG. 3. The shape and size of the hole 64 and consequently the liner 66 may vary based on a location of the riser joint 50 relative to the seabed, an internal diameter of the riser, etc. However, various shapes and sizes may be used. The liner 66 may be made of an elastomeric material or a metallic material that has the property to withstand the pressure of the mud and also to deform without breaking or cracking when the pressure of the mud is different from the pressure of the ambient. Thus, in an application, any material that is flexible enough and pressure resistant may be used for the liner 66.

The liner 66 is configured to fully cover hole 64 so that no fluid from inside the riser joint 50 is allowed to exit the riser or the other way around. The liner 66 is fixed to the riser, e.g., by being bolted between a bracket 68 and a cover 70. Bracket 68 may be attached to the riser joint 50. The cover 70 may be made of steel or another material that can withstand high pressures and/or corrosive environment. The cover 70 may be part of a flow meter 71.

Figure 4:
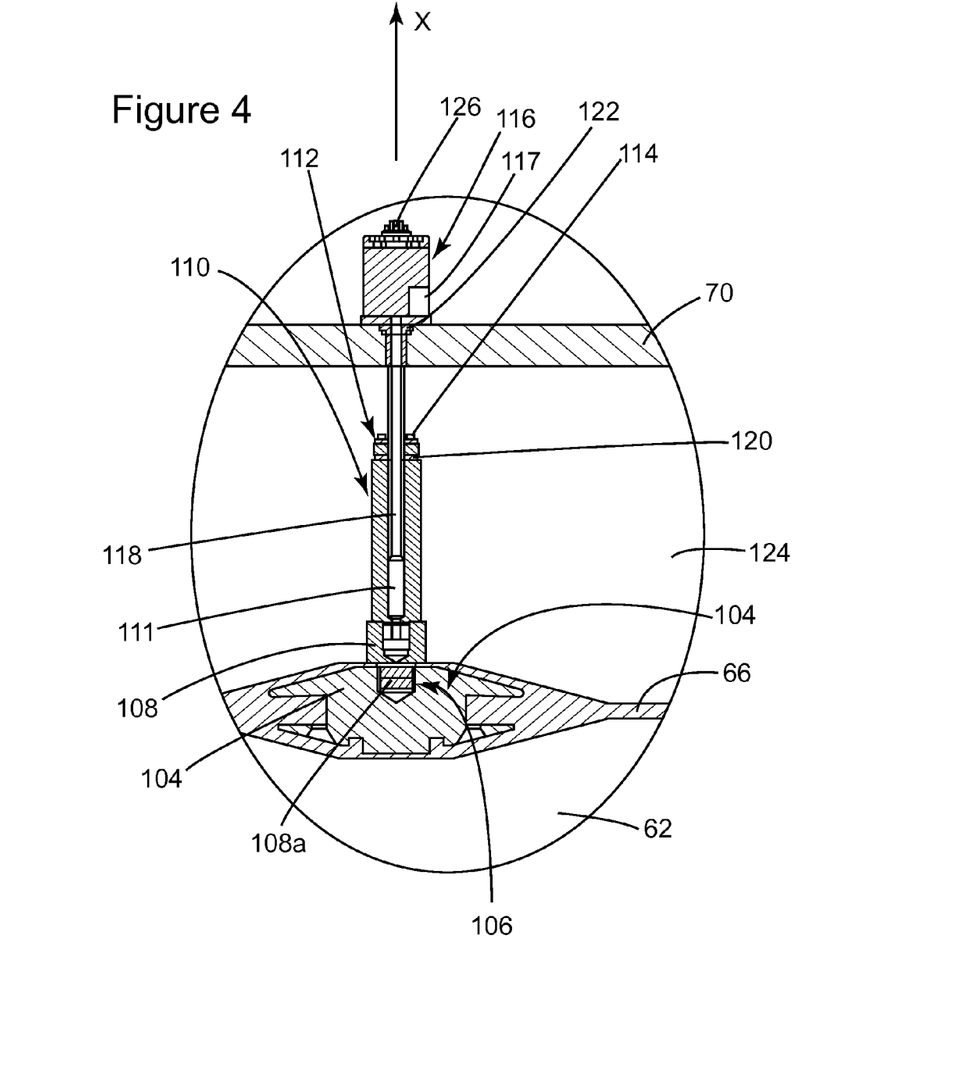
FIG. 4 is a schematic diagram of a flow meter according to an exemplary embodiment.

According to an exemplary embodiment, the liner 66 may include an insert 104, made for example, out of a metal. Other materials are also possible. The insert 104 may be provided towards a center of the liner 66. The insert 104 may also include a threaded hole 106 in which a base 108 having a matching threaded extension may be treaded. FIG. 4 shows in more details the elements discussed above. Base 108 has the threaded extension 108a inserted into insert 104 and it is configured to connect to a sensor rod 110. The sensor rod 110 may have a cylindrical shape with a bore 111 formed around the middle of the cylinder. The sensor rod 110 may be made integrally with the base 108 or as two different pieces that attach to each other, e.g., screw, weld, etc. A magnet assembly 112 may be attached to the sensor rod 110, e.g., by a bolt 114. The magnet assembly 112 may include one or more magnets having a disc form with a central bore configured to fit the central bore 111 of the sensor rod 110. In one application, the magnet assembly 112 may include plural magnets connected or not to each other.

A position sensor 116 (e.g., a transducer) may be attached to an outside of the skin 60 of the riser joint 50. FIG. 4 shows the position sensor attached to cover 70, outside cavity 124. The position sensor 116 ma have many configurations. For simplicity, only a magnetostrictive sensor is discussed next. The position sensor 116 includes a waveguide tube 118 that is configured to enter the bore 111 in the sensor rod 110 so that the sensor rod 110 is free to move along an axis X as shown in FIG. 4 when the insert 104 moves together with the liner 56 due to pressure changes inside the riser joint 50. A principle of operation of the position sensor 116 is discussed next. However, this discussion is exemplary and not intended to limit the types of sensors that may be used with the riser joint 50 for determining the flow of the mud.

A spacer 120, such as an o-ring, may be placed between magnet assembly 112 and sensor rod 110. Magnet assembly 112 may include two or more permanent magnets. In some embodiments, magnet assembly 112 may include three magnets; four magnets in other embodiments; and more than four magnets in yet other embodiments.

The stationary waveguide tube 118 may be located within the sensor rod 110. In one application, sensor rod 110 is radially spaced from the waveguide tube 118 so as not to interfere with the movement of liner 66 or to cause wear on waveguide tube 118. Similarly, magnet assembly 112 may be radially spaced apart from waveguide tube 118. In selected embodiments, magnets of the magnet assembly 112 may be in a plane transverse to waveguide tube 118.

Additionally, a conducting element or wire (not shown) may be located through the center of waveguide tube 118. Both the wire and waveguide tube 118 may be connected to the position sensor 116, located external to cover 70, through a communications port 122. Position sensor 116 (e.g., a transducer) may also include a suitable means for placing an interrogation electrical current pulse on the conducting wire. Appropriate O-rings or other seals (not shown) are located between the waveguide tube 118, the cover 70 and the position sensor 116 to seal against leaks.

As a pressure difference between the inside 62 of the riser joint 50 and a cavity 124 formed between the cover 70 and the liner 66 changes, the insert 104 with the sensor rod 110 and magnet assembly 112 move along axis X. Thus, by the operation of the magnetostrictive sensor disposed therein, it is possible to determine on a continuous basis the position of the liner 66 or insert 104 relative to a non-disturbed position. Based on this displacement of a portion the liner 66 and/or the insert 104, a flow rate of the mud through the inside 62 of the riser joint 50 may be determined.

With regard to the operation of the magnetostrictive sensor, magnetostriction refers to the ability of some metals, such as iron or nickel or iron-nickel alloys, to expand or contract when placed in a magnetic field. A magnetostrictive waveguide tube 118 may have an area within an external magnet assembly 112 that is longitudinally magnetized as magnetic assembly 112 is translated longitudinally about waveguide tube 118. Magnetic assembly 112, as described above, includes permanent magnets that may be located at evenly spaced positions apart from each other, in a plane transverse to waveguide tube 118, and radially equally spaced with respect to the surface of waveguide tube 118. An external magnetic field is established by magnetic assembly 112, which may longitudinally magnetize an area of waveguide tube 118.

Waveguide tube 118 surrounds a conducting wire (not shown) located along its axis. The conducting wire may be periodically pulsed or interrogated with an electrical current in a manner well-known in the art, such as by position sensor 116 located on the outside of cover 70. Such a current produces a toroidal magnetic field around the conducting wire and waveguide tube 118. When the toroidal magnetic field intersects with the magnetic field generated by the magnetic assembly 112, a helical magnetic field is induced in waveguide tube 118 to produce a sonic pulse that travels toward both ends of the waveguide tube 118. Suitable dampers (not shown) at the ends of waveguide tube 118 may prevent echo reverberations of the pulse from occurring. However, at the transducer end or head, the helical wave is transformed to a waveguide twist, which exerts a lateral stress in very thin magnetostrictive tapes connected to position sensor 116. A phenomenon known as the Villari effect causes flux linkages from magnets running through sensing coils to be disturbed by the traveling stress waves in the tapes and to develop a voltage across the coils. Position sensor 116 may also amplify this voltage for metering or control purposes.

Because the current pulse travels at nearly the speed of light, and the acoustical wave pulse travels roughly at only the speed of sound, a time interval exists between the instant that the head-end transducer receives each pulse compared with the timing of the electrical pulse produced by the head-end electronics. This time interval is a function of the distance that the external magnet assembly 112 is from the transducer end of the tube. By measuring the time interval and dividing it by the sound velocity of propagation inside the tube, the absolute distance of the magnet assembly from the head end of the tube can be determined. By proper calibration, this distance may be mapped to a flow inside the riser joint 50. For example, taking into account the internal diameter of the riser and the external diameter of the drill line, various pressure differences and implicitly displacements of the waveguide tube 116 may be correlated to the corresponding flows through the riser and stored in a predetermined table. Then, based on the predetermined table, a processor may identify the corresponding flow to a given pressure difference or displacement.

Position sensor 116 may have an interface 126 that allows electrical signals to be sent to the waveguide 118 and also to transmit a measurement of the waveguide 118 outside the position sensor. In one application, the electrical signals are exchanged between the position sensor 116 and a processor on the MUX pod (not shown) or a processor on the vessel 12. In another application, the position sensor 116 may include a processor 117 for determining the flow rate inside the riser 50.

Figure 5:
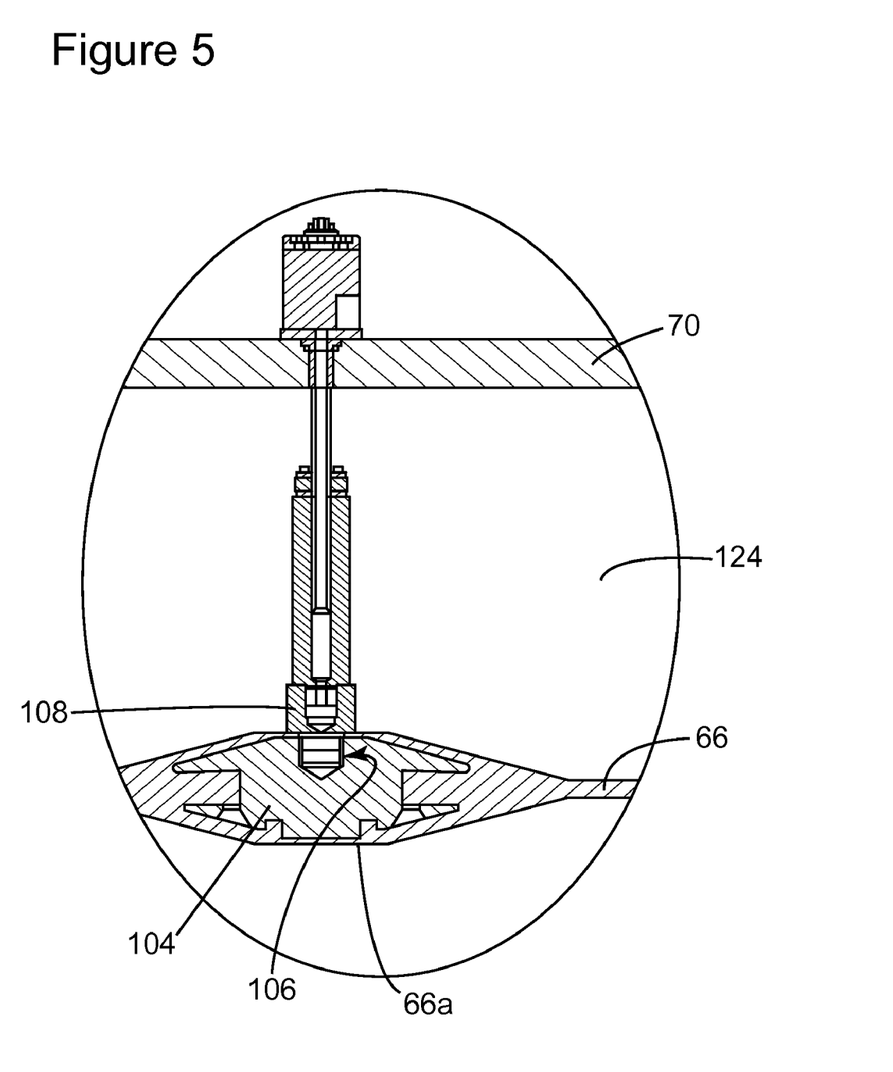
FIG. 5 is a schematic diagram of a flow meter according to an exemplary embodiment.

The liner 66 is discussed now with regard to FIG. 5. Liner 66 may have a variable thickness with a central portion 66a having a larger thickness for accommodating the insert 104. In one exemplary embodiment illustrated in FIG. 5, the insert 104 is fully embedded into the central portion 66a of the liner 66. Further, only the threaded hole 106 of the insert 104 is configured to be exposed to cavity 124 when the base 108 is not in place. Otherwise, the insert 104 is not exposed to the inside 62 and cavity 124.

Returning to FIG. 3, a compensating system 130 is configured to communicate with cavity 124 for controlling a pressure inside the cavity. In this respect, a pressure inside the cavity 124 is allowed to be equal to an ambient pressure, e.g., sea water pressure at the depth where the riser joint 50 is deployed. When the riser joint 50 is at the surface, the pressure inside cavity 124 is the atmospheric pressure. However, once deployed undersea, the pressure inside cavity 124 is maintained at ambient pressure by using, for example, a diaphragm or a piston 132 for separating the medium inside the cavity 124, e.g., air, and the sea water. The pressure inside the cavity 124 may be increased to account for the hydrostatic head applied by the mud column. For example, in 10,000 ft of water with 18 ppg mud the hydrostatic head may be around 4500 psi. This pressure applies a force to the liner that may need to be balanced. If this is the case, a piston 132 rather than a diaphragm may be preferred. The compensating system 130 may be fluidly linked to a pressure source, e.g., accumulators on the MUX pod, for providing an extra pressure inside cavity 124 for compensating the sea weight of the mud column. In one application, the pressure of the mud column being larger than the ambient pressure of the sea water at the level of the flow meter, a supplementary pressure may be applied to cavity 124 such that a sum of (i) the supplementary pressure and (ii) the ambient pressure of the sea water equals the pressure of the mud column. The supplementary pressure may be calculated based on the density of the mud column, density of sea water and the depth of the flow meter relative to the sea surface. These values may be stored in a storage device that is accessible either by the operator of the flow meter or by the processor determining the flow in the riser. Thus, in one application, the processor may automatically determine the supplementary pressure to be applied to the cavity 124.

Thus, when in use, the flow meter detects a flow rate of a fluid, e.g., mud inside the riser, based on the pressure difference of the mud at that depth and the sea water pressure at the same depth. If the flow though the riser is constant, the deformation of the liner 66 is constant and the position sensor 116 determines a single position. However, when the flow is irregular, the deformation of the liner 66 may change which determines the position of the sensor rod 110 to change. Thus, the position sensor 116 may determine a changing position and consequently, the processor analyzing this data may determine the fluid flow change inside the riser joint 50.

Figure 6:
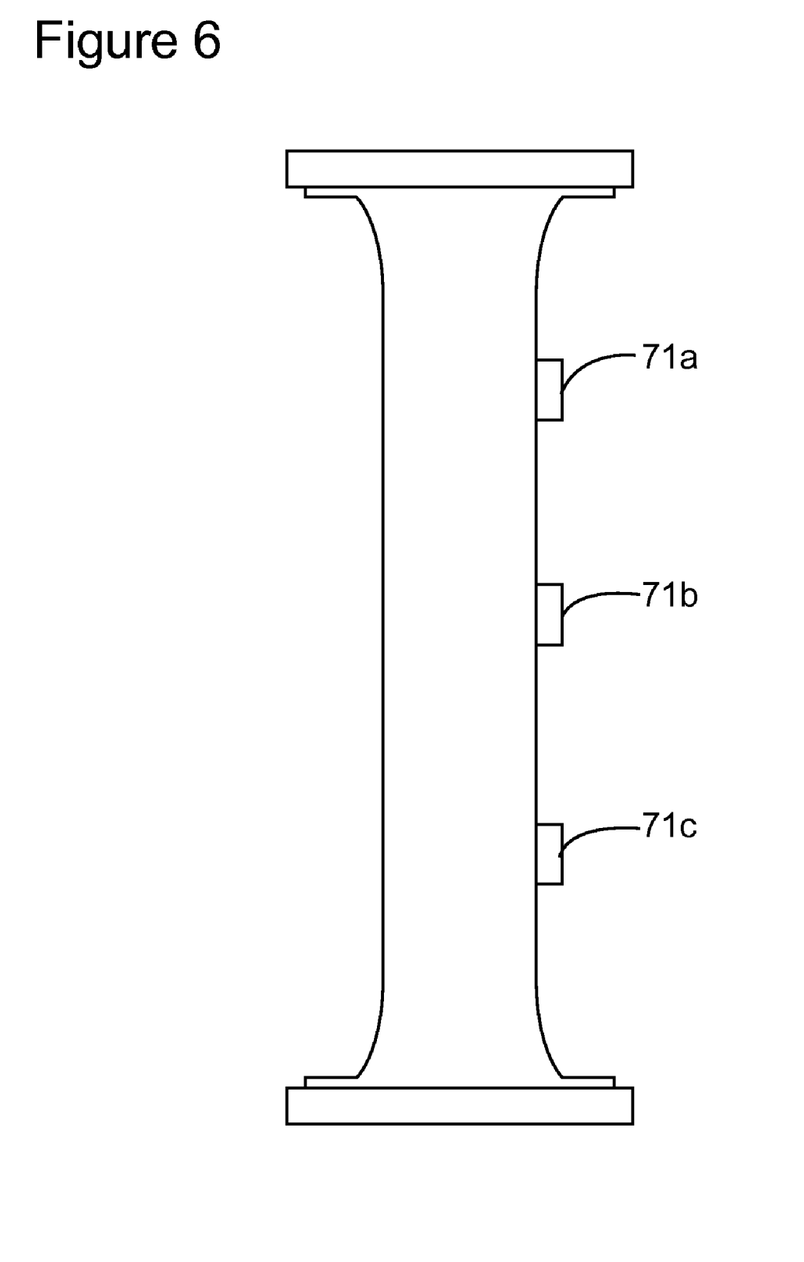
FIG. 6 is a schematic diagram of a riser having plural flow meters according to an exemplary embodiment.

According to an exemplary embodiment illustrated in FIG. 6, multiple flow meters 71a to 71c may be added to the riser joint 50. The number of flow meters may vary between one and ten. For providing an accurate reading, a size of the liner 66 may be correlated with a flow through the riser. Thus, for example, a first flow meter may be used for flows between 0 and 300 gpm (gallons per minute) and another one for flows between 300 and 600 gpm. The larger the area of the liner 66 the better the accuracy of the reading.

The differential pressure flow meter 71 discussed above is suitable for measuring a fluid flow in a riser provided undersea for the following reasons. Because the fluid flowing through the riser is dirty, e.g., may include rocks, stones, soil particles, etc., existing turbine flow meters would fail as the turbines and/or paddle wheel may get stuck. The ultrasonic and thermal mass flow meters are not suitable as the fluid density may be changing and also the solids concentration in the flow. The Coriolis and oval gear meters are also not suitable because of the minimal flow restriction allowed. Neither the Doppler meters are suitable as the flow may have air bubbles or solids circulating within. A subsea magnetic flow meter is not appropriate due to its minimal envelope dimensions.

Figure 7:
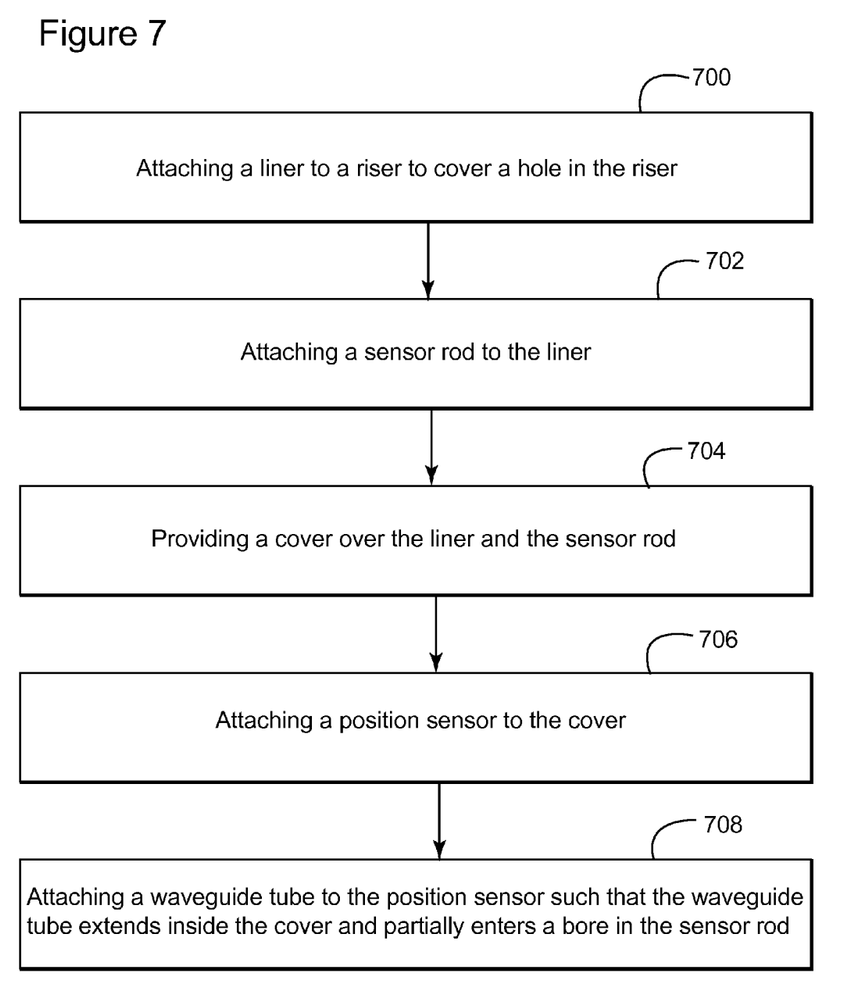
FIG. 7 is a flow chart illustrating steps of a method for attaching a flow meter to a riser according to an exemplary embodiment.

According to an exemplary embodiment illustrated in FIG. 7, there is a method for attaching a flow meter as discussed in the previous figures to a riser. The method includes a step 700 of attaching a liner to a riser to cover a hole in the riser, a step 702 of attaching a sensor rod to the liner, a step 704 of providing a cover over the liner and the sensor rod, a step 706 of attaching a position sensor to the cover, and a step 708 of attaching a waveguide tube to the position sensor such that the waveguide tube extends inside the cover and partially enters a bore in the sensor rod. Optionally, the method includes a step of attaching an insert to the liner, a step of screwing a base to the insert, a step of screwing the sensor rod into the base, etc.

The disclosed exemplary embodiments provide a flow meter, a riser and a method for measuring a flow through an inside of the riser. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A mudline riser annulus flow meter, the flow meter comprising: a liner configured to be attached to a riser to cover a hole; a cover configured to be attached to the riser to cover the liner such that a cavity is formed by the liner and the cover; an insert configured to be disposed within the liner; a base configured to be attached to the insert; a sensor rod configured to be attached to the base and to extend inside cavity, the sensor rod having a bore; a magnet assembly configured to be fixedly attached to the sensor rod; a position sensor attached to the cover; and a waveguide tube attached to the position sensor, wherein the bore of the sensor rod is configured to receive the waveguide tube.

2. The flow meter of claim 1, further comprising: a compensating mechanism connected to the cover and configured to provide an ambient pressure inside the cavity.

3. The flow meter of claim 2, wherein the compensating mechanism comprises a piston configured to apply a supplementary pressure to the cavity such that a sum of (i) the ambient pressure and (ii) the supplementary pressure is substantially equal to a pressure determined by a weight of a fluid inside the riser.

4. The flow meter of claim 1, wherein the sensor rod is provided completely inside the cavity.

5. The flow meter of claim 1, wherein a thickness of the liner where the insert is present is larger than a thickness of the liner where the insert is not present.

6. The flow meter of claim 1, wherein the base is screwed into the insert and the sensor rod is screwed into the base.

7. The flow meter of claim 1, wherein the insert, base, sensor rod and magnet assembly are configured to move relative to the waveguide tube when a pressure on the liner changes.

8. The flow meter of claim 1, wherein the waveguide tube is configured to generate an electrical signal when the magnet assembly moves relative to the waveguide tube.

9. The flow meter of claim 1, further comprising: an interface attached to the position sensor and configured to exchange electrical signals with a processor and the waveguide tube.

10. A mudline riser comprising: a first flow meter, wherein the first flow meter is configured to comprise, a liner configured to be attached to the riser to cover a hole; a cover configured to be attached to the riser to cover the liner such that a cavity is formed by the liner and the cover; an insert configured to be disposed within the liner; a base configured to be attached to the insert; a sensor rod configured to be attached to the base and to extend inside cavity, the sensor rod having a bore; a magnet assembly configured to be fixedly attached to the sensor rod; a position sensor attached to the cover; and a waveguide tube attached to the position sensor, wherein the bore of the sensor rod is configured to receive the waveguide tube.

11. The mudline riser of claim 10, further comprising: a second flow meter having a structure similar to the first flow meter, wherein an area of the liner of the first flow meter is different from an area of a liner of the second flow meter.

12. The mudline riser of claim 11, wherein the first flow meter is configured to measure a flow of 0 to about 300 gpm inside the riser and the second flow meter is configured to measure a flow of about 300 to about 600 gpm.

13. The mudline riser of claim 10, wherein the first flow meter is configured to measure a flow rate of a mud flowing through the riser by pressure difference between a pressure inside the riser and a pressure inside the cavity.

14. The mudline riser of claim 10, further comprising: a flange configured to be attached directly to a blowout preventer.

15. The mudline riser of claim 10, further comprising: a blowout preventer.

16. The mudline riser of claim 10, further comprising: a compensating mechanism connected to the cover and configured to provide an ambient pressure inside the cavity.

17. A mudline riser annulus flow meter, the flow meter comprising: a liner configured to be attached to a riser to cover a hole; a cover configured to be attached to the riser to cover the liner such that a cavity is formed by the liner and the cover; a sensor rod configured to be attached to the liner and to extend inside cavity, the sensor rod having a bore; a magnet assembly configured to be fixedly attached to the sensor rod; and a waveguide tube attached to the cover, wherein the bore of the sensor rod is configured to receive the waveguide tube.

18. The flow meter of claim 17, wherein the liner is an elastomer.

19. The flow meter of claim 17, further comprising: a compensating mechanism connected to the cover and configured to provide an ambient pressure inside the cavity.

20. The flow meter of claim 17, further comprising: an insert provided inside the liner and configured to hold the sensor rod.

* * * * *